United States Patent
Park et al.

(10) Patent No.: US 8,538,465 B2
(45) Date of Patent: Sep. 17, 2013

(54) METHOD FOR RECEIVING AND TRANSMITTING A PAGING MESSAGE

(75) Inventors: Gi Won Park, Gyeonggi-do (KR); Ki Seon Ryu, Gyeonggi-do (KR); Jeong Ki Kim, Gyeonggi-do (KR); Yong Ho Kim, Gyeonggi-do (KR); Young Soo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 424 days.

(21) Appl. No.: 12/997,174

(22) PCT Filed: Jun. 10, 2009

(86) PCT No.: PCT/KR2009/003101
§ 371 (c)(1),
(2), (4) Date: Mar. 21, 2011

(87) PCT Pub. No.: WO2009/151269
PCT Pub. Date: Dec. 17, 2009

(65) Prior Publication Data
US 2011/0163847 A1    Jul. 7, 2011

Related U.S. Application Data

(60) Provisional application No. 61/060,478, filed on Jun. 11, 2008.

(30) Foreign Application Priority Data

Jun. 25, 2008   (KR) .................... 10-2008-0060335

(51) Int. Cl.
*H04W 68/00*   (2009.01)

(52) U.S. Cl.
USPC .......................................................... 455/458

(58) Field of Classification Search
USPC .......................................................... 455/458
See application file for complete search history.

(56) References Cited

U.S. PATENT DOCUMENTS

| | | | |
|---|---|---|---|
| 5,150,362 A * | 9/1992 | Akerberg | 370/331 |
| 5,642,356 A | 6/1997 | Wenk | |
| 2008/0004044 A1 * | 1/2008 | Simpson et al. | 455/458 |
| 2008/0134230 A1 | 6/2008 | Kim et al. | |

* cited by examiner

*Primary Examiner* — Temica M Beamer
*Assistant Examiner* — Joel Ajay
(74) *Attorney, Agent, or Firm* — Birch, Stewart, Kolasch & Birch, LLP

(57) ABSTRACT

A method for receiving and transmitting a paging message is disclosed. A method for receiving a paging message in an idle mode of a mobile station comprises receiving a paging indicator channel included in a super frame header from a base station; if a paging message of the mobile station exists after identifying the paging indicator, identifying a wake-up time of the mobile station from mapping information of the paging indicator channel; and receiving the paging message from the base station by waking up at the wake-up time. According to the embodiments of the present invention, the paging indicator channel including information useful for the mobile station to receive the paging message is added to the IEEE 802.16m frame structure, whereby the power consumed to receive the paging message can be reduced.

11 Claims, 8 Drawing Sheets

METHOD FOR RECEIVING AND TRANSMITTING A PAGING MESSAGE

CROSS REFERENCE TO RELATED APPLICATIONS

This application is a National Phase of PCT/KR2009/003101 filed on Jun. 10, 2009, which claims priority under 35 USC 119(e) to U.S. Provisional Application No. 61/060,478 filed Jun. 11, 2008 and under 35 USC 119(a) to Patent Application No. 10-2008-0060335 filed in Republic of Korea, on Jun. 25, 2008, all of which are hereby expressly incorporated by reference into the present application.

TECHNICAL FIELD

The present invention relates to a super frame structure for reducing power consumption in transferring a paging message, and more particularly to, a method for receiving and transmitting a paging message to a super frame header or a neighboring region using a super frame including paging information.

BACKGROUND ART

In an idle mode of an IEEE (Institute of Electrical and Electronics Engineers) 802.16e system, paging is performed in a unit of paging group. A mobile station can belong to a plurality of paging groups, and a paging controller of each paging group performs paging of the mobile station if call or user packet of an external network occurs. At this time, the paging controller transfers a paging message to all base stations within a paging group, and the base stations which have received the paging message broadcast a paging advertisement message MOB_PAG-ADV to the mobile station.

FIG. 1 is a diagram illustrating a procedure of performing paging in an idle mode of the IEEE 802.16e system.

A mobile station receives a deregistration command message MOB_DREG-CMD from a base station when entering an idle mode. The mobile station identifies a paging cycle, paging offset, paging listening interval of a paging information field of the deregistration command message DREG-CMD. Then, the mobile station monitors a channel by using the identified paging cycle, paging offset, and paging listening interval, so as to receive a paging message transferred thereto.

According to the related art, a problem occurs in that the mobile station should monitor the paging message by continuously turning on a radio channel for a paging listening interval of maximum 5 OFDMA frames (25 ms) if the paging message is not transferred to the mobile station.

DISCLOSURE OF INVENTION

Technical Problem

An object of the present invention is to provide a method for receiving a paging message using a super frame structure for reducing power consumption in transferring a paging message.

Another object of the present invention is to provide a method for transmitting a paging message using a super frame structure for reducing power consumption in transferring a paging message.

Technical Solution

In order to solve the above technical problems, a method for receiving a paging message in a mobile station according to one embodiment of the present invention comprises receiving a paging indicator channel included in a neighboring region of a super frame header from a base station; if a paging message of the mobile station exists after identifying the paging indicator, identifying a wake-up time of the mobile station from mapping information of the paging indicator channel; and receiving the paging message from the base station by waking up at the wake-up time.

Preferably, the paging indicator channel includes paging group ID, a paging indicator field, and mapping information of a downlink subframe of the paging message.

Preferably, the paging indicator channel is arranged between the super frame header and a downlink synchronization channel.

Preferably, the step of identifying the wake-up time of the mobile station includes identifying whether a paging message to be received exists using paging ID received from the base station when the mobile station enters the idle mode.

In order to solve the above technical problems, a method for receiving a paging message in an idle mode of a mobile station according to another embodiment of the present invention comprises receiving a paging indicator channel included in a super frame header from a base station; if a paging message of the mobile station exists after identifying the paging indicator, identifying a wake-up time of the mobile station from mapping information of the paging indicator channel; and receiving the paging message from the base station by waking up at the wake-up time.

Preferably, the paging indicator channel includes paging group ID, a paging indicator field, and mapping information of a downlink subframe of the paging message.

Preferably, the paging indicator channel is arranged separately from information per paging group within the super frame header.

Preferably, the paging indicator channel includes a paging indicator channel for a large paging group and a paging indicator channel for a small paging group.

Preferably, the mapping information includes a number of a frame or subframe where the paging message received.

Preferably, the step of identifying the wake-up time of the mobile station includes identifying whether a paging message to be received exists using paging ID received from the base station when the mobile station enters the idle mode.

In order to solve the above technical problems, a method for transmitting a paging message from a base station of a wireless communication system according to other embodiment of the present invention comprises transmitting a paging indicator channel to a mobile station which is in an idle mode, the paging indicator channel including paging group ID, a paging indicator field, and mapping information of a downlink subframe of a paging message; and transmitting the paging message to the mobile station in a frame or subframe indicated by the mapping information of the paging indicator channel.

Preferably, the paging indicator channel is arranged between a super frame header and a downlink synchronization channel.

Preferably, the paging indicator channel is included in a super frame header.

Preferably, the method further comprises transmitting paging ID of the mobile station to the mobile station if the mobile station requests entrance to the idle mode.

Advantageous Effects

According to the embodiments of the present invention, the paging indicator channel including information useful for the mobile station to receive the paging message is added to the IEEE 802.16m frame structure, whereby the power consumed to receive the paging message can be reduced.

BEST MODE FOR CARRYING OUT THE INVENTION

Hereinafter, the preferred embodiments of the present invention will be described with reference to the accompanying drawings. It is to be understood that various modifications can be made in the embodiments of the present invention and the scope of the present invention is not limited to the following embodiments.

In a method for receiving and transmitting a paging message according to one embodiment of the present invention, a paging indicator channel (PICH) including information required for a mobile station to receive a paging message is added to a super frame header (SFH) located in the first subframe of a super frame, whereby power consumption of the mobile station can be reduced. Paging group ID, page ID, and a mapping information field are provided to the paging indicator channel, whereby the power of the mobile station, which is consumed to receive the paging message, can be reduced. The page ID is used to determine whether a paging message is transferred to the mobile station, and the mapping information field includes information as to subframe or frame in which the paging message is decoded.

Hereinafter, a method for receiving a paging message transmitted from a network while minimizing power consumption by identifying the presence of a paging message transferred to a mobile station through paging indicator channel information received through a specific frame of a super frame, for example, a first frame, and identifying a start point of a downlink subframe to be decoded will be described.

Figure 1:
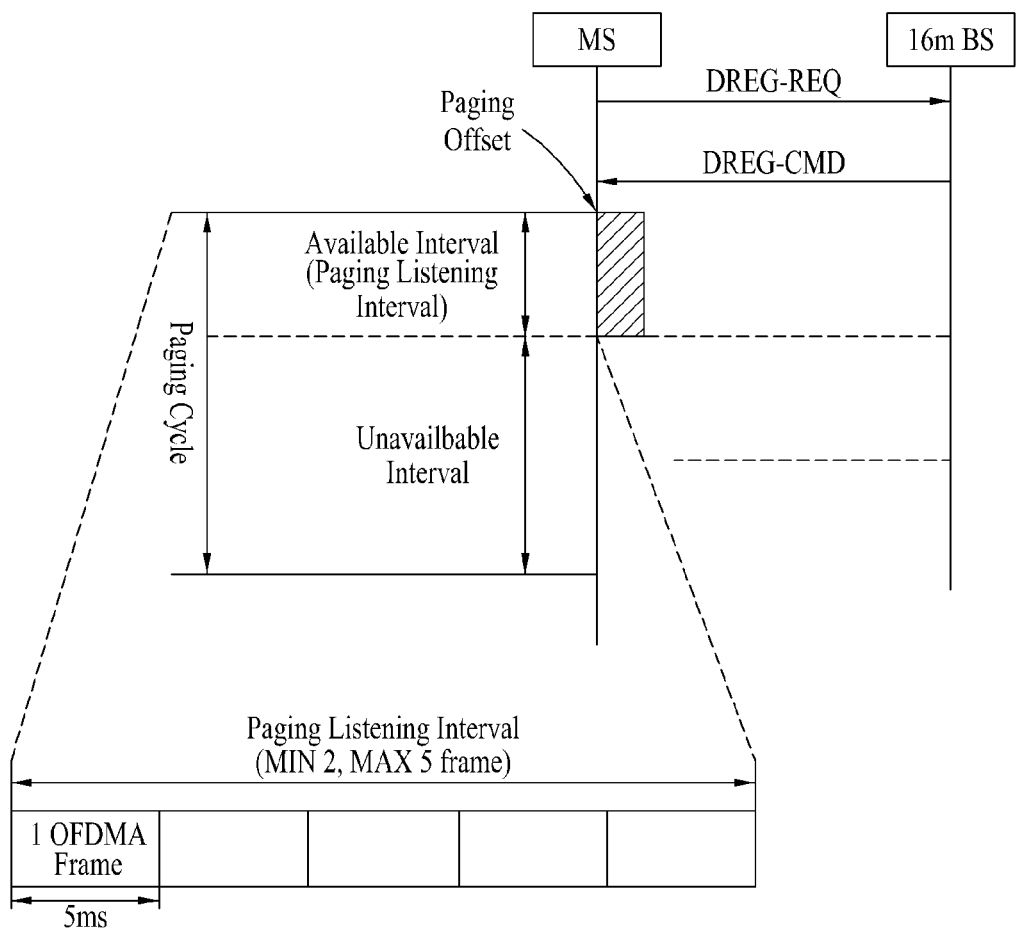
FIG. 1 is a diagram illustrating an example of a procedure of performing paging in an idle mode of IEEE 802.16e.
Figure 2:
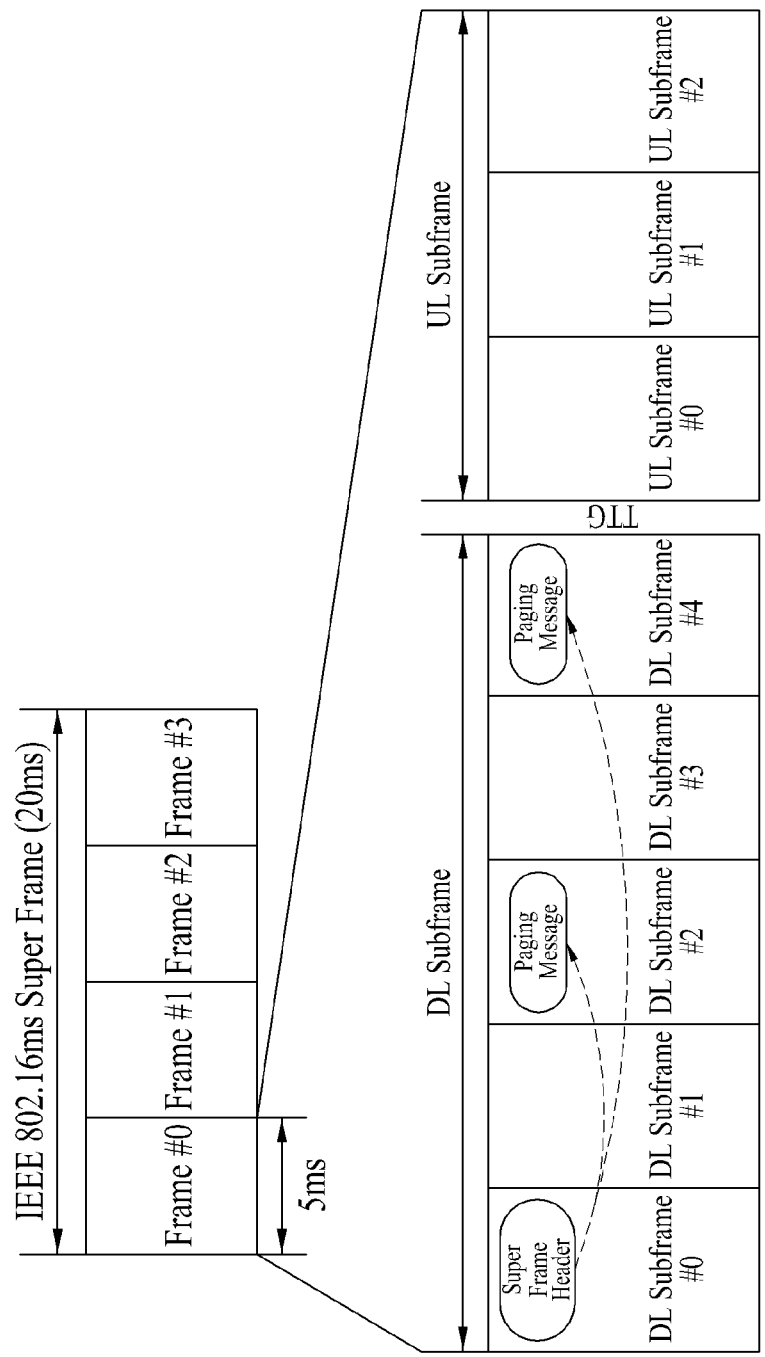
FIG. 2 is a diagram illustrating an example of a super frame of four frames and paging messages indicated by a super frame header.

FIG. 2 is a diagram illustrating an example of a super frame of four frames and paging messages indicated by a super frame header.

The super frame includes four frames, each of which includes five downlink subframes and three uplink subframes.

Figure 3:
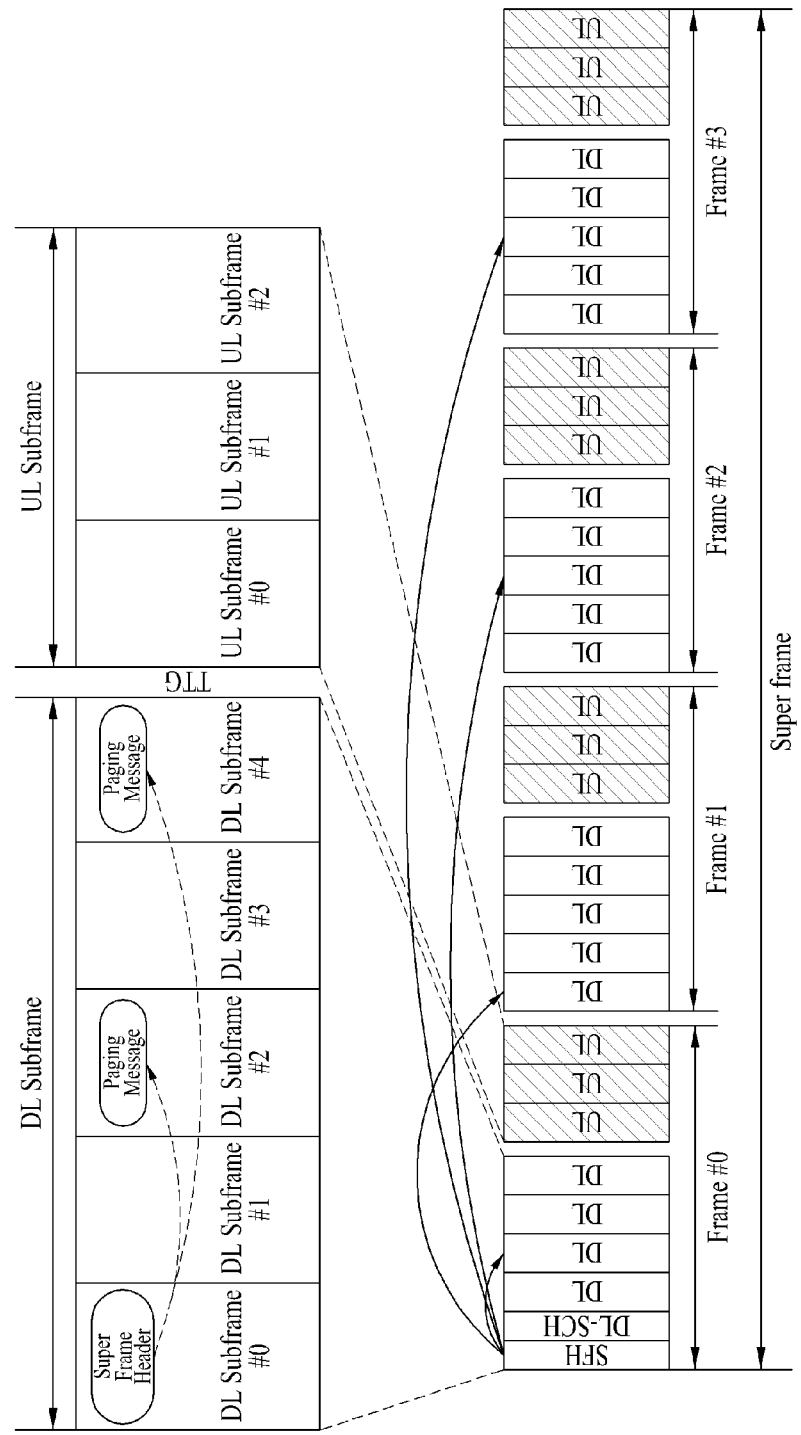
FIG. 3 is a diagram illustrating a frame structure based on a TDM mode.

FIG. 3 is a diagram illustrating an example of a frame structure based on a TDM mode.

The super frame header is generally located in the first downlink subframe of the first frame (Frame #0) of the super frame. A downlink synchronization channel (DL-SCH) may be arranged to adjoin the super frame header.

In FIG. 3, the paging indicator channel is included the super frame header. The subframes indicated by the paging indicator channel include the third downlink subframe of the first frame (Frame #0), the first downlink subframe of the second frame (Frame #1), the third subframe of the third frame (Frame #2), and the third subframe of the fourth frame (Frame #3). The paging messages are transmitted through these subframes.

Figure 4:
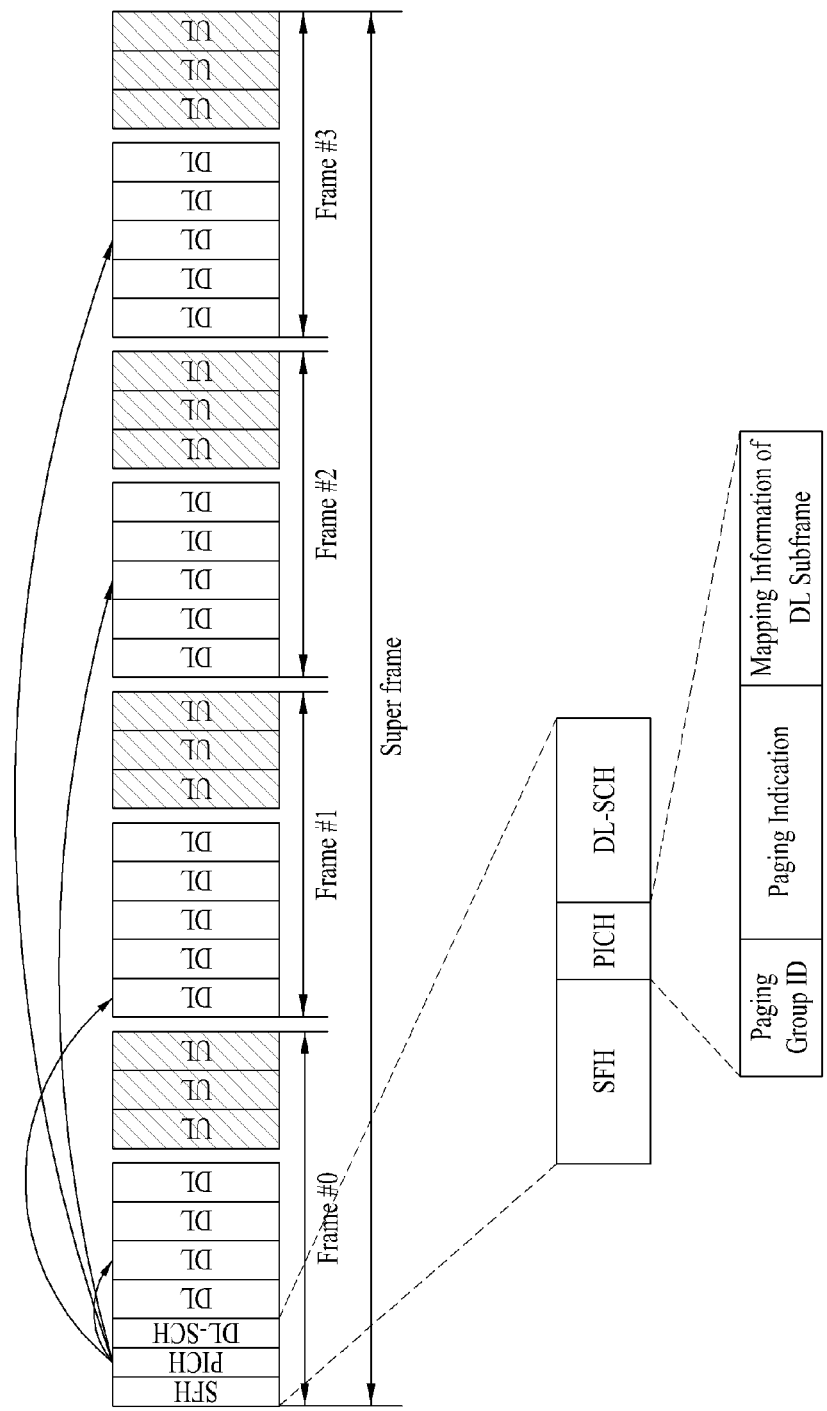
FIG. 4 is a diagram illustrating a structure of a paging indicator channel according to one embodiment of the present invention.

FIG. 4 is a diagram illustrating a structure of paging indicator channel according to one embodiment of the present invention.

As illustrated in FIG. 4, the paging indicator channel can be located outside the super frame header. The paging indicator channel can include paging group ID, a paging indicator, and a mapping information field. The paging indicator includes page ID.

Table 1 illustrates an example of a field that can be included in the paging indicator channel.

As illustrated in Table 1, a base station can page a group of mobile stations having the same page ID per paging group to which the base station belongs. The mobile station is allocated with unique page ID of 48 bits from the base station when entering an idle mode, and the base station performs paging by identifying the mobile station using some bits (for example, several least significant bits (LSB)) among a total of 48 bits of page ID of the mobile station. In this way, paging message overhead can be reduced. In this case, page ID of 48 bits is only exemplary and its size may be varied.

TABLE 1

| Parameter Name | Length | Value |
|---|---|---|
| Paging Group ID | | ID of Paging Group |
| Page ID | | |
| PageID1 | 6 | Paging ID LSBs |
| PageID2 | 12 | Paging ID LSBs |
| PageID3 | 18 | Paging ID LSBs |
| PageID4 | 24 | Paging ID LSBs |
| PageID5 | 30 | Paging ID LSBs |
| PageID6 | 36 | Paging ID LSBs |
| PageID7 | 42 | Paging ID LSBs |
| PageID8 | 48 | Paging ID LSBs |
| Mapping Information | Variable | Information of DL Subframe positon which MS should decodes paging message. per PageID(1~8) |

As illustrated in Table 1, the base station can page the mobile station by selectively using any one of a total of 48 bits of page ID including LSBs of 6 bits of page ID. Also, the mapping information field can include information as to a start point when the paging message is decoded by the mobile station. The mobile station compares its paging ID allocated from the base station with page ID included in the paging indicator channel. If page ID identical with several LSBs of paging ID of the mobile station exists in the paging indicator channel, the mobile station can recognize that the paging message transferred thereto exists. Afterwards, the mobile station can identify when to decode a downlink subframe or frame by identifying mapping information.

Figure 5:
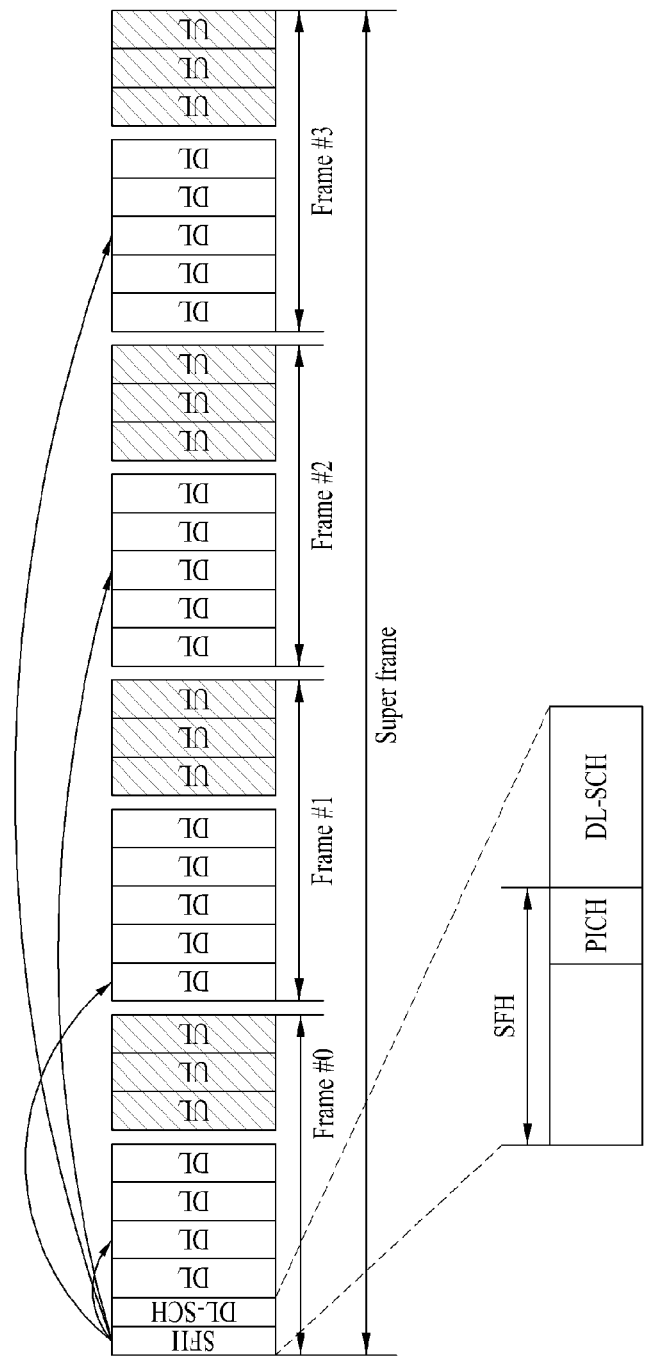
FIG. 5 is a diagram illustrating a structure of a paging indicator channel according to another embodiment of the present invention.

FIG. 5 is a diagram illustrating a structure of a paging indicator channel according to another embodiment of the present invention.

As illustrated in FIG. 5, the paging indicator channel may be inserted to the super frame header located at a start point of the first downlink subframe. In this case, the super frame header can include a primary broadcast channel (PBCH) and a secondary broadcast channel (SBCH) in addition to the paging indicator channel.

The PBCH is a channel that includes information for a large paging group, and the SBCH is a channel that includes information for a small paging group. In this case, the large paging group is a set of one or more small paging groups, and the small paging group means a paging group of a minimum unit controlled by a paging controller. Large paging group ID can be transferred through the PBCH, and small paging group ID can be transferred through the SBCH.

Figure 6:
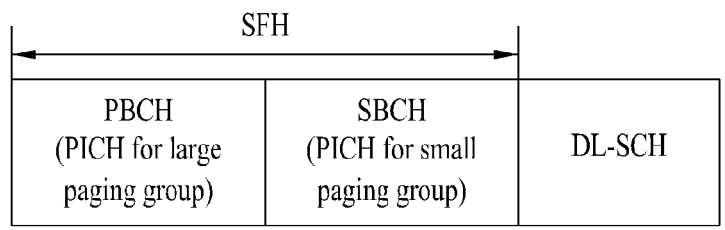
FIG. 6 is a diagram illustrating an example that a paging indicator channel of FIG. 4 is divided into a large paging group and a small paging group.

FIG. 6 is a diagram illustrating an example that the paging indicator channel of FIG. 5 is divided into a large paging group and a small paging group.

In FIG. 6, it is assumed that the paging group is divided into a large paging group and a small paging group in the IEEE 802.16m system.

If the paging indicator channel is divided as illustrated in FIG. 6, a paging indicator channel of the PBCH is used to page mobile stations within the large paging group, and a paging indicator channel of the SBCH is used to page mobile stations within the small paging group. Also, information within the PBCH can be broadcasted to the mobile stations using a single frequency network (SFN).

Figure 7:
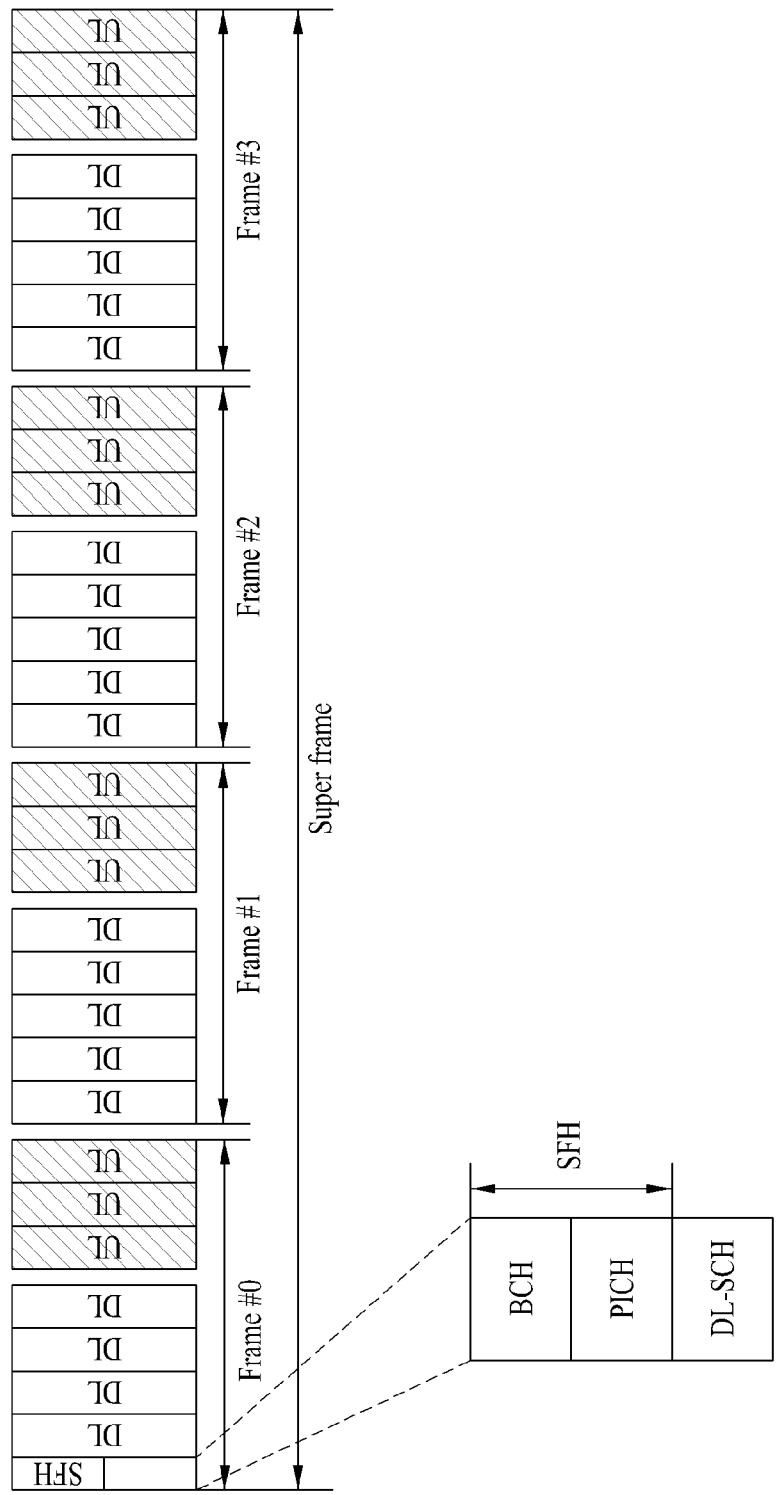
FIG. 7 is a diagram illustrating a structure of a paging indicator channel according to one embodiment of the present invention if an FDM mode is used.

FIG. 7 is a diagram illustrating a structure of a paging indicator channel according to one embodiment of the present invention if an FDM mode is used.

In FIG. 7, the paging indicator channel is located within a super frame control header. In this case, the super frame control header includes a broadcast channel (BCH) and a paging indicator channel (PICH).

Figure 8:
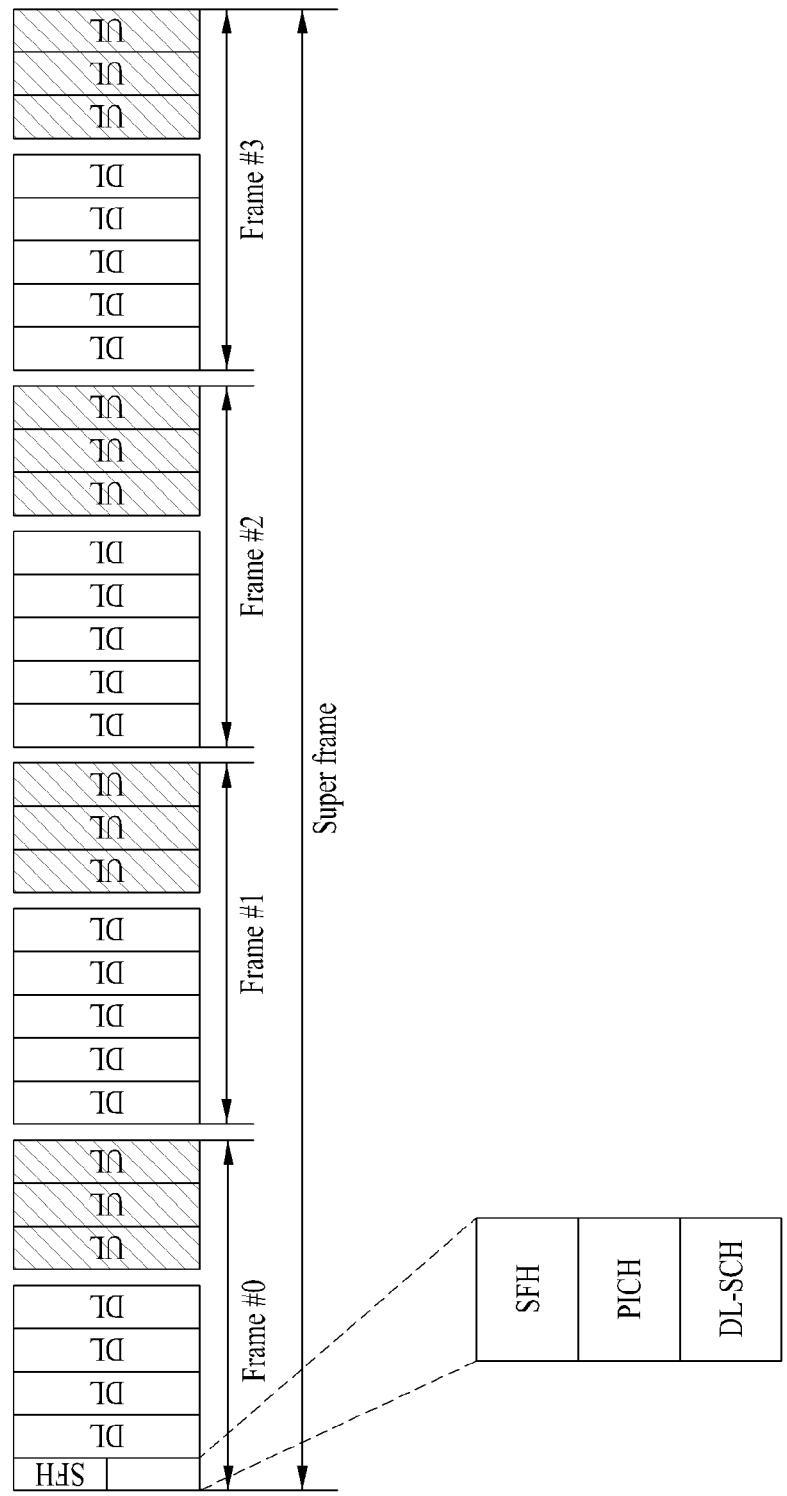
FIG. 8 is a diagram illustrating a structure of a paging indicator channel according to another embodiment of the present invention if an FDM mode is used.

FIG. 8 is a diagram illustrating a structure of a paging indicator channel according to another embodiment of the present invention if an FDM mode is used.

In FIG. 8, the paging indicator channel is located outside the super frame control header. In this case, the paging indicator channel is located between the super frame control header and a downlink synchronization channel (DL-SCH) in a frequency domain.

The mobile station periodically calculates a wake-up time to receive its paging message based on paging cycle and paging offset allocated from the base station when entering an idle mode.

The mobile station maintains a turn-off state of a radio channel to reduce power consumption in an idle mode and then turns on a receiver at the wake-up time, i.e., the time calculated through paging cycle and paging offset, thereby identifying the presence of its paging message. At this time, if there is no paging message transferred to the mobile station, the mobile station turns off the receiver to reduce power consumption. If there is a paging message transferred to the mobile station, the mobile station transits to a normal mode and performs communication with the base station which has paged the mobile station.

The base station can indicate the presence of the paging message transferred to each mobile station through a paging indicator of the paging indicator channel, for example, page ID. Also, the base station can include start point information of a downlink subframe or frame in the mapping information field, wherein the start point information means the time when the mobile station will start decoding of the paging message.

Figure 9:
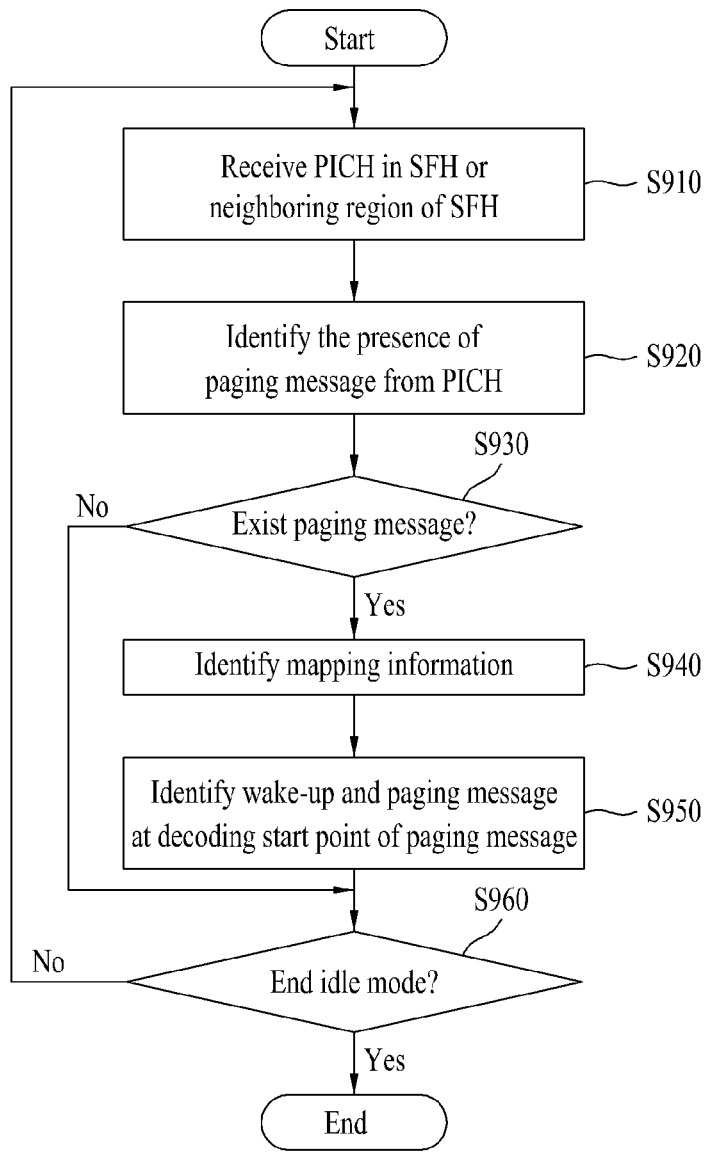
FIG. 9 is a flow chart illustrating a method for receiving a paging message according to one embodiment of the present invention.

FIG. 9 is a flow chart illustrating a method for receiving a paging message according to one embodiment of the present invention.

The mobile station maintains a turn-off state of a radio channel to minimize power consumption in an idle mode and then turns on a receiver at a wake-up time to decode a paging indicator channel of either a super frame header or a neighboring region of the super frame header (S910). In this case, the wake-up time could be a value determined through the paging cycle and the paging offset, which are allocated when the mobile station enters the idle mode. The mobile station identifies the presence of its paging message through the paging indicator channel (S920). At this time, the procedure of identifying the presence of the paging message can include a procedure of identifying page ID of the paging indicator channel. If there is no paging message transferred to the mobile station, the mobile station turns off the receiver to reduce power consumption.

If there is a paging message transferred to the mobile station (S930), the mobile station determines a subframe or frame to be decoded by identifying the mapping information field (S940). The mobile station can perform the operation for reducing power consumption until it reaches the determined subframe or frame.

The mobile station wakes up at the start point of decoding, which is previously determined, and identifies and receives the paging message in the subframe indicated by mapping information (S950).

The above steps are repeated until the idle mode ends (S960).

In order to decode the paging message in a unit of subframe, each mobile station can be allocated with paging cycle, paging offset, paging sub offset, or paging frame offset from the base station when entering the idle mode.

For example, each mobile station identifies the wake-up time to identify whether there exists a paging message transferred thereto, through the paging cycle and the paging offset allocated from the base station, and recognizes that the paging message transferred thereto exists by waking up at the identified wake-up time. Then, the mobile station can identify a downlink subframe for decoding the paging message through the allocated paging cycle and paging sub offset. For another example, if the paging frame offset is allocated to the mobile station, the mobile station can identify a downlink frame for decoding the paging offset through the paging frame offset. Namely, the mobile station identifies the paging message by decoding several downlink subframes or frames for one super frame time to decode the paging message.

Meanwhile, in order to decode the paging message in a unit of frame, each mobile station can be allocated with paging cycle, paging offset, and paging message offset from the base station when entering the idle mode. For example, each mobile station can identify the wake-up time to identify whether a paging message transferred thereto exists, through the paging cycle and the paging offset allocated from the base station. After recognizing that the paging message transferred to the mobile station exists by waking up at the identified wake-up time, the mobile station can decode the paging message in a downlink frame fixed to decode the paging message. Namely, the mobile station identifies the paging message from the downlink frame fixed for one super frame time to decode the paging message.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention relates to a method for receiving and transmitting a paging message to a super frame header or a neighboring region using a super frame including paging information. The method of the present invention can be applied to a base station, a mobile station, etc. in a system which uses a super frame, such as IEEE 802.16m.

The invention claimed is:

1. A method for receiving a paging message of a mobile station in an idle mode, the method comprising:

receiving a paging indicator channel included in a super frame header from a base station, wherein the paging indicator channel includes a paging group ID, a paging indicator field, and mapping information of a downlink subframe of the paging message;

when the paging message for the mobile station exists as a result of identifying the paging indicator channel, identifying a wake-up time of the mobile station from the mapping information of the paging indicator channel; and receiving the paging message from the base station by waking up at the wake-up time, wherein the paging indicator channel includes a paging indicator channel for a large paging group and a paging indicator channel for a small paging group.

2. The method of claim 1, wherein the paging indicator channel is arranged separately from information per paging group within the super frame header.

3. The method of claim 1, wherein the mapping information includes a number of a frame or subframe where the paging message received.

4. The method of claim 1, wherein the step of identifying the wake-up time of the mobile station includes identifying whether a paging message to be received exists using paging ID received from the base station when the mobile station enters the idle mode.

5. A method for receiving a paging message in an idle mode of a mobile station, the method comprising:

receiving a paging indicator channel included in a neighboring region of a super frame header from a base station, wherein the paging indicator channel includes a paging group ID, a paging indicator field, and mapping information of a downlink subframe of the paging message;

when the paging message for the mobile station exists as a result of identifying the paging indicator channel, identifying a wake-up time of the mobile station from the mapping information of the paging indicator channel; and receiving the paging message from the base station by waking up at the wake-up time, wherein the paging indicator channel includes a paging indicator channel for a large paging group and a paging indicator channel for a small paging group.

6. The method of claim 5, wherein the paging indicator channel is arranged between the super frame header and a downlink synchronization channel.

7. The method of claim 5, wherein the step of identifying the wake-up time of the mobile station includes identifying whether a paging message to be received exists using paging ID received from the base station when the mobile station enters the idle mode.

8. A method for transmitting a paging message of a base station in a wireless communication system, the method comprising:

transmitting a paging indicator channel to a mobile station in an idle mode, the paging indicator channel including a paging group ID, a paging indicator field, and mapping information of a downlink subframe for the paging message; and transmitting the paging message to the mobile station in a frame or subframe indicated by the mapping information of the paging indicator channel, wherein the paging indicator channel includes a paging indicator channel for a large paging group and a paging indicator channel for a small paging group.

9. The method of claim 8, wherein the paging indicator channel is included in a super frame header.

10. The method of claim 8, wherein the paging indicator channel is arranged between a super frame header and a downlink synchronization channel.

11. The method of claim 8, further comprising transmitting the paging ID of the mobile station to the mobile station if the mobile station requests entrance to the idle mode.

* * * * *